US009998587B2

(12) United States Patent
Barillaud et al.

(10) Patent No.: US 9,998,587 B2
(45) Date of Patent: *Jun. 12, 2018

(54) REARRANGING DISPLAY OF MOBILE APPLICATIONS BASED ON GEOLOCATION

(71) Applicant: International Business Machines Corporation, Armonk, NY (US)

(72) Inventors: Franck Barillaud, Austin, TX (US); Insoo Cho, Pittsburgh, PA (US); Daniel Christiani, Rochester, NY (US); Mark R. Thill, Seattle, WA (US); David S. Zhang, Norcross, GA (US)

(73) Assignee: International Business Machines Corporation, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/070,517

(22) Filed: Mar. 15, 2016

(65) Prior Publication Data

US 2016/0196039 A1 Jul. 7, 2016

Related U.S. Application Data

(63) Continuation of application No. 14/510,250, filed on Oct. 9, 2014.

(51) Int. Cl.
*H04M 1/725* (2006.01)
*G06F 9/44* (2018.01)
(Continued)

(52) U.S. Cl.
CPC ...... *H04M 1/72572* (2013.01); *G06F 3/0482* (2013.01); *G06F 3/04817* (2013.01);
(Continued)

(58) Field of Classification Search
CPC ......... H04M 1/72572; H04M 1/72569; H04M 1/72586; H04M 2250/10; H04W 4/02;
(Continued)

(56) References Cited

U.S. PATENT DOCUMENTS 9,247,380 B1   1/2016   Vincent
9,285,944 B1   3/2016   Penilla et al.
(Continued)

OTHER PUBLICATIONS

Office Action, dated Nov. 4, 2016, regarding U.S. Appl. No. 14/510,250, 28 pages.
(Continued)

*Primary Examiner* — Maryam M Ipakchi
*Assistant Examiner* — Mong-Shune Chung
(74) *Attorney, Agent, or Firm* — Yee & Associates, P.C.; Steven L. Bennett

(57) ABSTRACT

Rearranging a set of generated application display panels is provided. A set of application display icons corresponding to a set of mobile applications installed on a mobile data processing system having matching keyword tags with a geolocation keyword tag corresponding to a defined geographic area is inserted into a set of generated application display panels. The set of generated application display panels with the inserted set of application display icons corresponding to the set of mobile applications having the matching keyword tags is rearranged based on the geolocation keyword tag corresponding to the defined geographic area. The rearranged set of generated application display panels with the inserted set of application display icons corresponding to the set of mobile applications having the matching keyword tags is displayed.

5 Claims, 6 Drawing Sheets

(51) Int. Cl.
  *G06F 9/445* (2018.01)
  *G06F 3/0481* (2013.01)
  *G06F 3/0482* (2013.01)
  *G06F 3/0484* (2013.01)
  *H04W 4/04* (2009.01)

(52) U.S. Cl.
  CPC ........ *G06F 3/04845* (2013.01); *G06F 9/4443* (2013.01); *G06F 9/4451* (2013.01); *H04W 4/04* (2013.01); *G06F 2221/2111* (2013.01); *H04M 1/72586* (2013.01)

(58) Field of Classification Search
  CPC .... H04W 4/04; G06F 3/04817; G06F 3/0482; G06F 3/04845; G06F 9/4451; G06F 9/4443; G06F 2221/2111
  See application file for complete search history.

(56) References Cited

U.S. PATENT DOCUMENTS

| | | | |
|---|---|---|---|
| 2005/0130680 A1 | 6/2005 | Northcutt et al. | |
| 2012/0309433 A1* | 12/2012 | Jeong | H04M 1/72572 455/457 |
| 2013/0007662 A1 | 1/2013 | Bank et al. | |
| 2013/0130669 A1* | 5/2013 | Xiao | H04M 1/72566 455/418 |
| 2015/0089359 A1 | 3/2015 | Brisebois | |

OTHER PUBLICATIONS

Hamburger, "Aviate: an always-changing, intelligent home screen for Android," The Verge, Oct. 15, 2013, 4 pages. http://www.theverge.com/2013/10/15/4839162/aviate-android-home-screen-app-google-now.

Barillaud et al., "Rearranging Display of Mobile Applications Based on Geolocation," U.S. Appl. No. 14/510,250, filed Oct. 9, 2014, 37 pages.

Final Office Action, dated Mar. 10, 2017, regarding U.S. Appl. No. 14/510,250, 21 pages.

Notice of Allowance, dated Nov. 3, 2017, regarding U.S. Appl. No. 14/510,250, 23 pages.

Office Action, dated Jun. 30, 2017, regarding U.S. Appl. No. 14/510,250, 29 pages.

\* cited by examiner

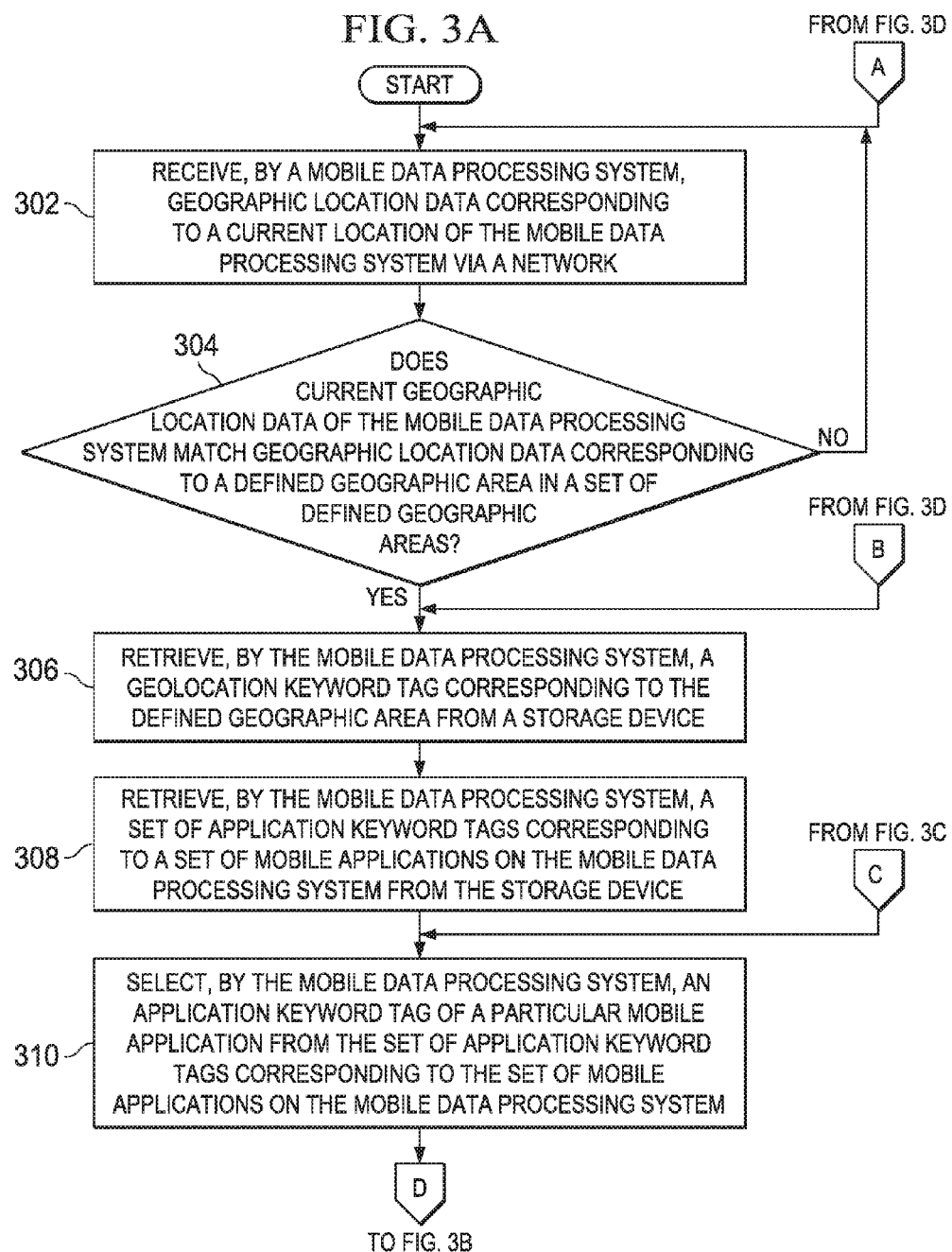

REARRANGING DISPLAY OF MOBILE APPLICATIONS BASED ON GEOLOCATION

This application is a continuation of prior application Ser. No. 14/510,250, filed Oct. 9, 2014.

BACKGROUND

1. Field

The disclosure relates generally to mobile data processing system devices and more specifically to rearranging a display of applications on a mobile data processing system device based on a current geographic location of the mobile data processing system device.

2. Description of the Related Art

Computer technology, in both hardware and software, has enabled mobile data processing system devices, such as, cellular telephones, smart phones, personal digital assistants, laptop computers, tablet computers, handheld computers, gaming devices, smart watches, and the like, to execute programs and applications that previously required a personal desktop computer. These mobile data processing system devices are becoming increasingly popular, but are subject to certain constraints, such as, relatively small display screens. Applications installed on these mobile data processing system devices are typically displayed as graphical icons on a screen, and are typically launched by touching the screen over a graphical icon corresponding to a particular application. Due to the large number of applications installed on these mobile data processing system devices and the limited viewing area of the display screens, locating desired application icons among the multitude of application icons may be difficult.

SUMMARY

According to one illustrative embodiment, a method for rearranging a set of generated application display panels is provided. A mobile data processing system inserts a set of application display icons corresponding to a set of mobile applications installed on the mobile data processing system having matching keyword tags with a geolocation keyword tag corresponding to a defined geographic area into a set of generated application display panels. The mobile data processing system rearranges the set of generated application display panels with the inserted set of application display icons corresponding to the set of mobile applications having the matching keyword tags based on the geolocation keyword tag corresponding to the defined geographic area. The mobile data processing system displays the rearranged set of generated application display panels with the inserted set of application display icons corresponding to the set of mobile applications having the matching keyword tags.

BRIEF DESCRIPTION OF THE SEVERAL VIEWS OF THE DRAWINGS

FIGS. 3A-3D are a flowchart illustrating a process for rearranging a set of generated application display panels in accordance with an illustrative embodiment.

DETAILED DESCRIPTION

Figure 1:
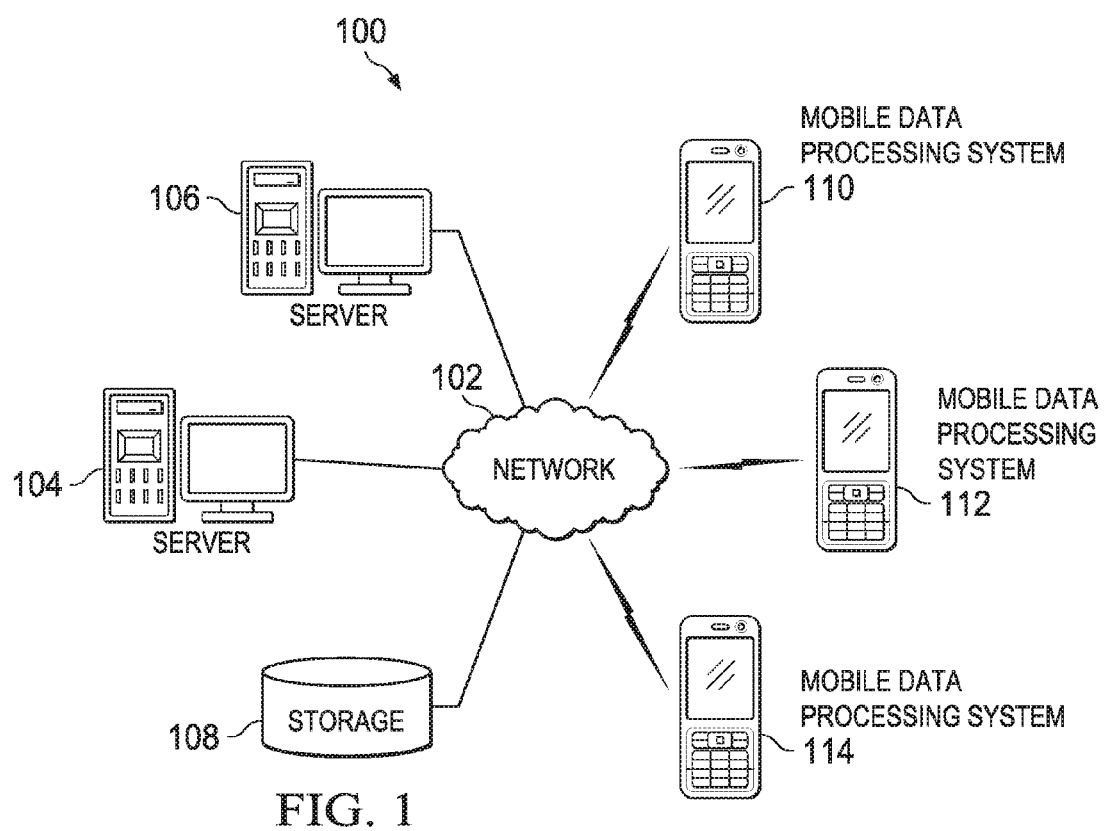
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
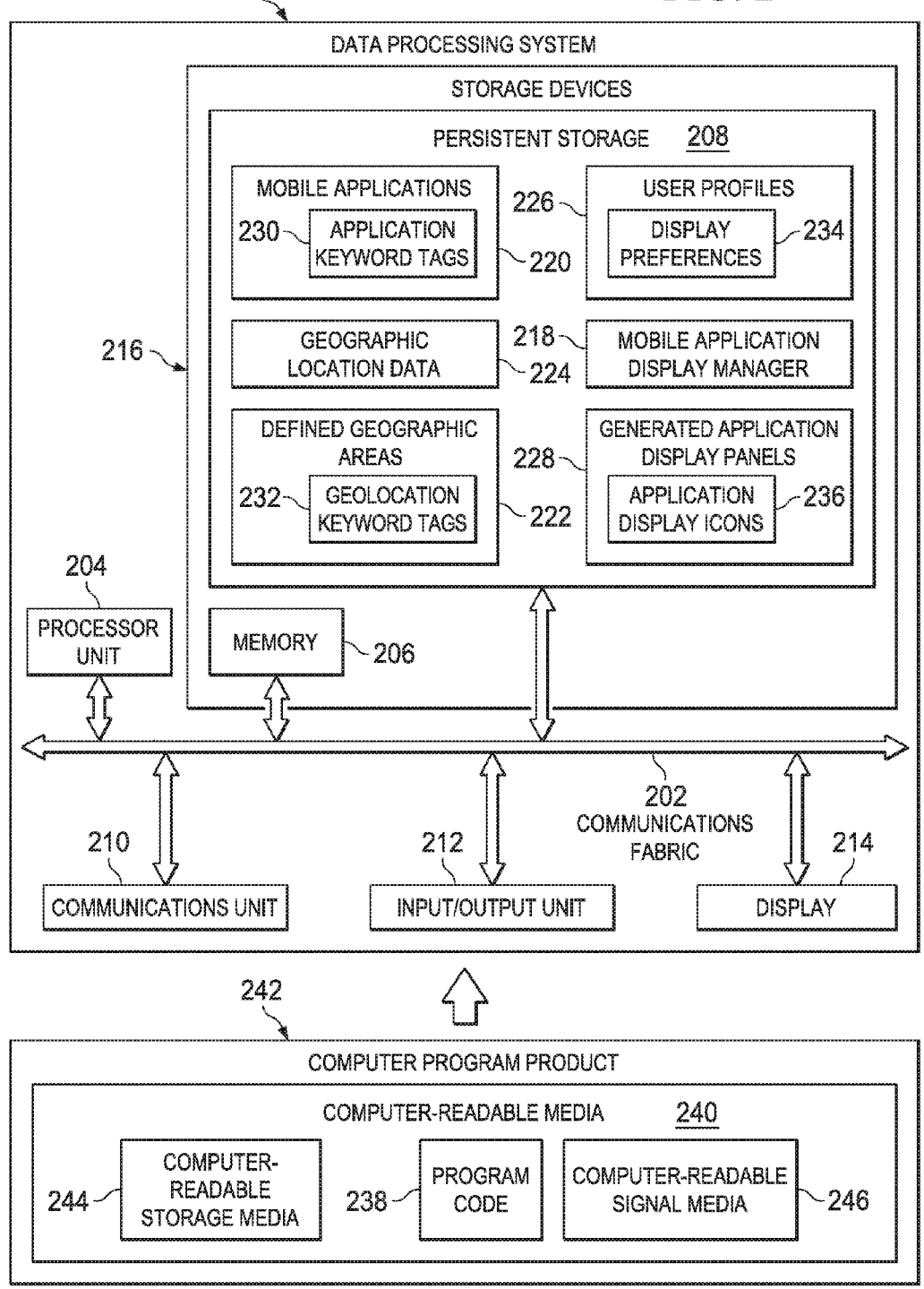
FIG. 2 is a diagram of a data processing system in which illustrative embodiments may be implemented.
Figure 3B:
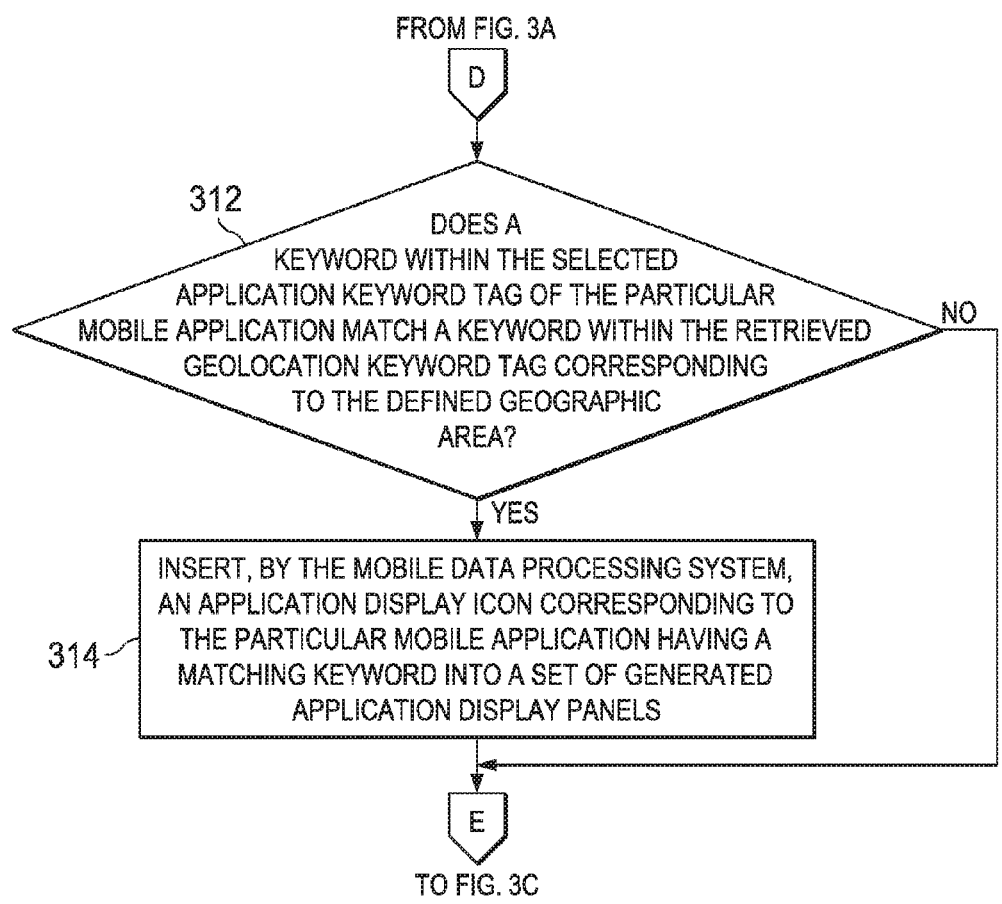
Figure 3C:
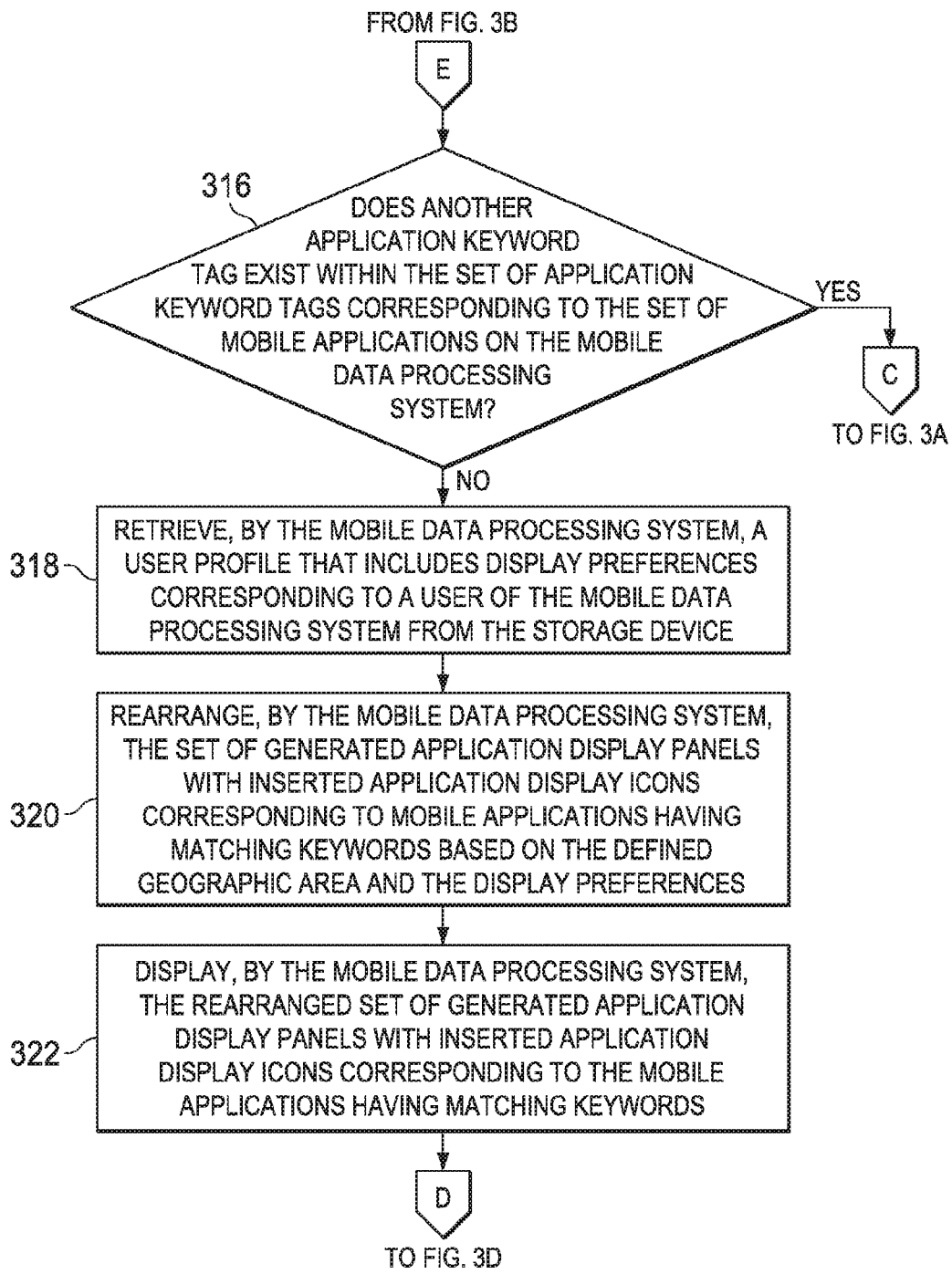
Figure 3D:
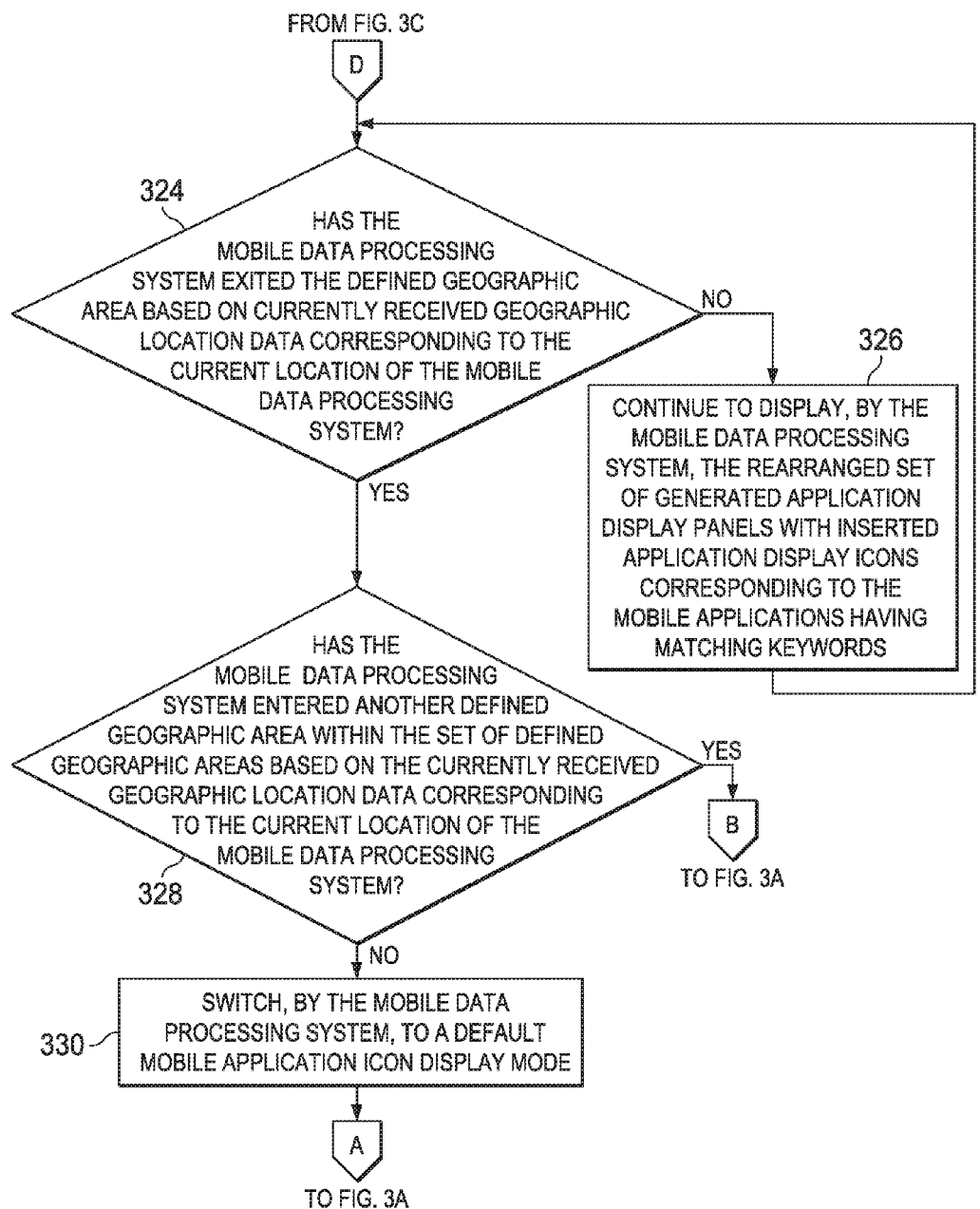

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, mobile data processing system devices, and other devices in which the illustrative embodiments may be implemented. Network data processing system 100 contains network 102, which is the medium used to provide communications links between the computers, mobile data processing system devices, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices connected to network 102. For example, server 104 and server 106 may provide one or more application display managing services to users of client mobile data processing system devices. An application display managing service is a process that rearranges a display of application icons on a client mobile data processing system device based on a current geographic location of the mobile data processing system device.

Mobile data processing system device 110, mobile data processing system device 112, and mobile data processing system device 114 also connect to network 102. Mobile data processing system devices 110, 112, and 114 are clients to server 104 or server 106. In the depicted example, server 104 or server 106 may provide information, such as boot files, operating system images, and applications to mobile data processing system devices 110, 112, and 114. Users of mobile data processing system devices 110, 112, and 114 may utilize mobile data processing system devices 110, 112, and 114 to access the application display managing services provided by server 104 or server 106.

In this example, mobile data processing system devices 110, 112, and 114 are mobile communication devices, such as, for example, cellular telephones or smart phones, with wireless communication links to network 102. However, it should be noted that mobile data processing system devices 110, 112, and 114 are intended as examples only. For example, mobile data processing system devices 110, 112, and 114 may also be laptop computers, tablet computers, handheld computers, personal digital assistants, smart watches, or gaming devices with wireless communication links to network 102. In addition, mobile data processing system devices 110, 112, and 114 may represent any combination of different mobile data processing system devices connected to network 102.

Storage 108 is a network storage device capable of storing data in a structured format or unstructured format. Storage 108 may provide storage of a plurality of different user names and associated identification numbers; user profiles; and user account information associated with an application display managing service network. Storage 108 also may store application display managing applications, geographic coordinates for a plurality of different geographic areas, keyword tags corresponding to the plurality of different geographic areas, lists of applications installed on each client mobile data processing device, keyword tags corresponding to each of the applications included in the lists of applications, graphical icons corresponding to each of the applications, maps of the plurality of different geographic areas, geographic location data corresponding to each of the client mobile data processing system devices. Further, storage unit 108 may store other data, such as authentication or credential data that may include user names, passwords, and biometric data associated with the plurality of users and system administrators. It should be noted that storage unit 108 may store any data that may be utilized by the voice modulation service network.

In addition, it should be noted that network data processing system 100 may include any number of additional server devices, client mobile data processing system devices, and other devices not shown. Program code located in network data processing system 100 may be stored on a computer readable storage medium and downloaded to a computer or other data processing device for use. For example, program code may be stored on a computer readable storage medium on server 104 and downloaded to mobile data processing system device 110 over network 102 for use on mobile data processing system device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer or a mobile data processing system, such as server 104 or mobile data processing system 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores mobile application display manager 218, mobile applications 220, defined geographic areas 222, geographic location data 224, user profiles 226, and generated application display panels 228. However, it should be noted that persistent storage 208 may store any type of application, program, module, and data utilized by the different illustrative embodiments.

Mobile application display manager 218 is a software program that controls the display of mobile applications 220 within display 214. Mobile applications 220 are a set of two or more software applications installed on data processing system 200. Mobile applications 220 are designed to work with mobile data processing systems, such as mobile data processing system 104 in FIG. 1. However, it should be noted that mobile applications 220 may represent any type of software application and not just mobile applications.

In this example, mobile applications 220 include application keyword tags 230. However, it should be noted that in alternative illustrative embodiments, application keyword tags 230 may be stored separately from mobile applications 220. In addition, each mobile application within mobile applications 220 has a set of one or more application keyword tags associated with it. A user of data processing system 200 creates the set of one or more application keyword tags for applications within mobile applications 220. An application keyword tag is a tag that contains one or more natural language keywords or phrases that describe or identify the subject matter of a particular application within mobile applications 220. For example, an application keyword tag associated with a particular application may contain words or phrases, such as, for example, calendar, sporting event scores, stock market quotes, traffic, or work, to identify what the user may utilize that particular application for.

Defined geographic areas 222 represent a plurality of different pre-defined geographic areas. Defined geographic areas 222 may be pre-defined by, for example, an application service provider that provides mobile applications as a service to mobile client devices. As another example, defined geographic areas 222 may be pre-defined by a company that owns one or more mobile applications, which the company provides to mobile data processing systems used by employees of the company so the employees can perform their respective duties using the mobile data processing systems installed with the company's applications. As a further example, the user of data processing system 200 may delineate defined geographic areas 222. A defined geographic area may be, for example, a room within a building, a portion of a room with a building, several rooms within a building, an entire building, a complex of several building with surrounding property, a city block, a street, a city, a state, a region, a country, a continent, or any other type of geographic division. A defined geographic area may be delineated using, for example, geographic coordinates, such as longitude, latitude, and elevation. In addition, defined geographic areas 222 may be delineated using a set of maps.

In this example, defined geographic areas 222 include geolocation keyword tags 232. However, it should be noted that in alternative illustrative embodiments, geolocation keyword tags 232 may be stored separately from defined geographic areas 222. Further, each defined geographic area within defined geographic areas 222 has a set of one or more geolocation keyword tags associated with it. The application service provider or company that provides a particular application may create the set of geolocation keyword tags corresponding to that particular application. The user of data processing system 200 also may create a set of geolocation keyword tags corresponding to defined geographic areas within defined geographic areas 222. A geolocation keyword tag is a tag that contains one or more natural language keywords or phrases that describe or identify a defined geographic area within defined geographic areas 222. For example, a geolocation keyword tag corresponding to a particular defined geographic area may contain words or phrases, such as, for example, company main office complex, company branch building, my office space, route to work, or home.

Geographic location data 224 are information pertaining to a current geographic location of data processing system 200. Geographic location data 224 may be provided by a global positioning system transceiver located in data processing system 200. Alternatively, geographic location data 224 may be provided using, for example, cell tower triangulation.

User profiles 226 are a set of one or more profiles associated with one or more users of data processing system 200. Each user profile within user profiles 226 includes display preferences 234. Display preferences 234 are created by the user that corresponds to a particular user profile. Display preferences 234 define how applications within mobile applications 220 are displayed within generated application display panels 228. For example, display preferences 234 may define that applications are to be displayed alphabetically, displayed by order of usage (i.e., most frequently used), or displayed by last used order (i.e., most recently used).

Generated application display panels 228 represent a set of one or more application display panels that data processing system 200 generates to display application display icons 236 to a user of data processing system 200 on display 214. Application display icons 236 represent graphical icons that the user of data processing system 200 may activate to launch a particular application within mobile applications 220. Data processing system 200 may utilize mobile application display manager 218 to rearrange application display icons 236 on generated application display panels 228 based on matching the current geographic location of data processing system 200 to the geographic coordinates of a defined geographic area and display preferences.

Communications unit 210, in this example, provides for communication with other data processing system devices, such as mobile data processing systems 112 and 114, server 106, and storage 108 in FIG. 1. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more other devices used to transmit and receive data, such as a modem or a network adapter. Further, a memory may be, for example, memory 206 or a cache such as found in an interface and memory controller hub that may be present in communications fabric 202.

In the course of developing illustrative embodiments it was discovered that with the sprawl of mobile applications across multiple display panels on mobile data processing devices, it's not easy to quickly locate applications of interest by a user of a mobile data processing system device. A mobile application is a computer program designed to run on mobile data processing system devices, such as, for example, smart phones, tablet computers, and other mobile devices. Mobile applications are typically available through application distribution platforms, such as application service providers. Some mobile applications are free to download, while others must be purchased prior to download. The explosion in number and variety of mobile applications installed on mobile data processing systems makes discovery of particular mobile application icons a challenge.

Typically, users of these mobile data processing system devices manually organize their applications by putting the applications within display panels based on some user criterion or preference, such as how often an application is used. Getting access to a specific application requires going through the different display panels making the process slow and inefficient.

Illustrative embodiments utilize coordinate data corresponding to a current geographic location of a mobile data processing system device to rearrange the display of application icons within panels to bring forward the most relevant applications for a particular defined geographic area. For example, when an employee of a company enters the company's building complex, illustrative embodiments may display the graphical icons for the company's email system application, calendar application, and instant messaging application within a front or uppermost panel currently being displayed to the employee.

A defined geographic area is a logical abstraction mapped to a two-dimensional (2D) or three-dimensional (3D) physical geographic location. Defined geographic areas may be stored in a storage device on mobile data processing systems. Alternatively, defined geographic areas may be stored on a server device.

Illustrative embodiments may represent a building using, for example, the building's geographic coordinates in latitude, longitude, and elevation. A mobile data processing system device utilizing illustrative embodiments may determine that the mobile data processing system device is currently located within a defined geographic area by matching stored defined geographic area data with current geographic location data of the mobile data processing system. Alternatively, the mobile data processing system device may send on a predetermined time interval basis its current geographic location data to a server device. If the coordinates of the mobile data processing system device are inside the perimeter of a defined geographic area, then the server may send a notification to the mobile data processing system device to trigger some action locally on the mobile data processing system device.

A user of a mobile data processing system device tags each application installed on the mobile data processing system device with one or more keywords. Illustrative embodiments use the application keyword tags to rearrange the display of the applications within a set of panels based on matching application keyword tags with defined geographic area keyword tags. The tags may be stored on the mobile data processing system device, on a server device, or both.

As an illustrative example, when a mobile data processing system device enters a defined geographic area, the server device may send a notification to the mobile data processing system device that the mobile data processing system device has entered a particular defined geographic area. Upon receipt of the notification from the server device, the mobile data processing system device may request that the server device send a set of geolocation keyword tags corresponding to the particular defined geographic area entered by the mobile data processing system device. After receiving the set of geolocation keyword tags corresponding to the particular defined geographic area from the server device, illustrative embodiments running on the mobile data processing system device determine whether a match exists between the set of geolocation keyword tags corresponding to the particular defined geolocation area and one or more application keyword tags corresponding to applications installed on the mobile data processing system device. If a match is found between tags, then illustrative embodiments rearrange the application icons within a set of display panels based on the matching tags and display preferences. When the mobile data processing system leaves the particular defined geographic area, illustrative embodiments again rearrange the display of application icons within the set of display panels based on an original layout of the application icons or on a default application display layout.

With reference now to FIGS. 3A-3D, a flowchart illustrating a process for rearranging a set of generated application display panels is shown in accordance with an illustrative embodiment. The process shown in FIGS. 3A-3D may be implemented in a mobile data processing system, such as, for example, mobile data processing system 110 in FIG. 1 and data processing system 200 in FIG. 2. However, it should be noted that one or more of the steps shown in FIGS. 3A-3D may be implemented in a server device, such as, for example, server 104 in FIG. 1, in addition to or instead of on the mobile data processing system.

The process begins when the mobile data processing system receives geographic location data corresponding to a current location of the mobile data processing system via a network (step 302). The geographic location data may be, for example, geographic location data 224 in FIG. 2. The network may be, for example, network 102 in FIG. 1.

After receiving the geographic location data in step 302, the mobile data processing system makes a determination as to whether current geographic location data of the mobile data processing system matches geographic location data corresponding to a defined geographic area in a set of defined geographic areas (step 304). The defined geographic area in the set of defined geographic areas may be, for example, a defined geographic area in defined geographic areas 222 in FIG. 2. If the mobile data processing system determines that the current geographic location data of the mobile data processing system does not match geographic location data corresponding to a defined geographic area in the set of defined geographic areas, no output of step 304, then the process returns to step 302 where the mobile data processing system continues to receive the geographic location data corresponding to the current location of the mobile data processing system via the network. If the mobile data processing system determines that the current geographic location data of the mobile data processing system does match geographic location data corresponding to a defined geographic area in the set of defined geographic areas, yes output of step 304, then the mobile data processing system retrieves a geolocation keyword tag corresponding to the defined geographic area from a storage device (step 306). The geolocation keyword tag corresponding to the defined geographic area may be, for example, a geolocation keyword tag within geolocation keyword tags 232 corresponding to a particular defined geographic area within defined geographic areas 222 in FIG. 2. The storage device may be, for example, persistent storage 208 in FIG. 2.

In addition, the mobile data processing system retrieves a set of application keyword tags corresponding to a set of mobile applications on the mobile data processing system from the storage device (step 308). The set of application keyword tags corresponding to the set of mobile applications on the mobile data processing system may be, for example, application keyword tags 230 corresponding to mobile applications 220 on data processing system 200 in FIG. 2. Subsequently, the mobile data processing system selects an application keyword tag of a particular mobile application from the set of application keyword tags corresponding to the set of mobile applications on the mobile data processing system (step 310).

Further, the mobile data processing system makes a determination as to whether a keyword within the selected application keyword tag of the particular mobile application matches a keyword within the retrieved geolocation keyword tag corresponding to the defined geographic area (step 312). If the mobile data processing system determines that a keyword within the selected application keyword tag of the particular mobile application does match a keyword within the retrieved geolocation keyword tag corresponding to the defined geographic area, yes output of step 312, then the mobile data processing system inserts an application display icon corresponding to the particular mobile application having a matching keyword into a set of generated application display panels (step 314) and the process proceeds to step 316 thereafter. The application display icon corresponding to the particular mobile application may be, for example, an application display icon within application display icons 236 in FIG. 2. The set of generated application display panels may be, for example, generated application display panels 228 in FIG. 2.

If the mobile data processing system determines that a keyword within the selected application keyword tag of the particular mobile application does not match a keyword within the retrieved geolocation keyword tag corresponding to the defined geographic area, no output of step 312, then the mobile data processing system makes a determination as to whether another application keyword tag exists within the set of application keyword tags corresponding to the set of mobile applications on the mobile data processing system (step 316). If the mobile data processing system determines that another application keyword tag does exist within the set of application keyword tags corresponding to the set of mobile applications on the mobile data processing system, yes output of step 316, then the process returns to step 310 where the mobile data processing system selects another application keyword tag.

If the mobile data processing system determines that another application keyword tag does not exist within the set of application keyword tags corresponding to the set of mobile applications on the mobile data processing system, no output of step 316, then the mobile data processing system retrieves a user profile that includes display preferences corresponding to a user of the mobile data processing system from the storage device (step 318). The user profile that includes display preferences corresponding to a user of the mobile data processing system may be, for example, a user profile within user profiles 226 that includes display preferences 234 in FIG. 2. Afterward, the mobile data processing system rearranges the set of generated application display panels with inserted application display icons corresponding to mobile applications having matching keywords based on the defined geographic area and the display preferences (step 320).

Further, the mobile data processing system displays the rearranged set of generated application display panels with inserted application display icons corresponding to the mobile applications having matching keywords (step 322). The mobile data processing system displays the rearranged set of generated application display panels within a display device of the mobile data processing system, such as, for example, display 214 in FIG. 2. Furthermore, the mobile data processing system makes a determination as to whether the mobile data processing system exited the defined geographic area based on currently received geographic location data corresponding to the current location of the mobile data processing system (step 324). If the mobile data processing system determines that the mobile data processing system has not exited the defined geographic area based on the currently received geographic location data corresponding to the current location of the mobile data processing system, no output of step 324, then the mobile data processing system continues to display the rearranged set of generated application display panels with inserted application display icons corresponding to the mobile applications having matching keywords (step 326).

If the mobile data processing system determines that the mobile data processing system has exited the defined geographic area based on the currently received geographic location data corresponding to the current location of the mobile data processing system, yes output of step 324, then the mobile data processing system makes a determination as to whether the mobile data processing system entered another defined geographic area within the set of defined geographic areas based on the currently received geographic location data corresponding to the current location of the mobile data processing system (step 328). If the mobile data processing system determines that the mobile data processing system has entered another defined geographic area within the set of defined geographic areas based on the currently received geographic location data corresponding to the current location of the mobile data processing system, yes output of step 328, then the process returns to step 308 where the mobile data processing system retrieves a geolocation keyword tag corresponding to the new geographic area.

If the mobile data processing system determines that the mobile data processing system has not entered another defined geographic area within the set of defined geographic areas based on the currently received geographic location data corresponding to the current location of the mobile data processing system, no output of step 328, then the mobile data processing system switches to a default mobile application icon display mode (step 330). Thereafter, the process returns to step 302 where the mobile data processing system continues to receive the geographic location data corresponding to the current location of the mobile data processing system via the network.

Thus, illustrative embodiments of the present invention provide a method, mobile data processing system, and computer program product for rearranging a set of generated application display panels with inserted application display icons corresponding to mobile applications installed on a mobile data processing system device based on a defined geographic area corresponding to a current location of the mobile data processing system device and display preferences of a user of the mobile data processing system device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for rearranging display of application icons based on geolocation, the method comprising:
    sending, by a mobile data processing device, current geographic location data of the mobile data processing device to a server device via a network, wherein the current geographic location data is provided by a global positioning system transceiver located in the mobile data processing device;
    receiving, by the mobile data processing device, from the server device via the network a notification indicating that the mobile data processing device entered a first defined geographic area based on the current geographic location data, wherein the first defined geographic area is one of a plurality of defined geographic areas that are predefined and delineated by geographic coordinates stored on the server device;
    sending, by the mobile data processing device, a request to the server device via the network for a set of geolocation keyword tags corresponding to the first defined geographic area in response to receiving the notification, wherein the set of geolocation keyword tags are stored on the server device and contain one or more natural language keywords that identify the first defined geographic area entered by the mobile data processing device;
    receiving, by the mobile data processing device, from the server device via the network the set of geolocation keyword tags containing the one or more natural language keywords that identify the first defined geographic area entered by the mobile data processing device;
    retrieving, by the mobile data processing device, a set of application keyword tags corresponding to a set of mobile applications installed on the mobile data processing device from a storage device of the mobile data processing device, wherein each of the set of application keyword tags contain one or more natural language keywords identifying a subject matter of each corresponding mobile application in the set of mobile applications set by a user of the mobile data processing device;
    matching, by the mobile data processing device, natural language keywords contained in the set of geolocation keyword tags identifying the first defined geographic area entered by the mobile data processing device with natural language keywords contained in the set of application keyword tags corresponding to the set of mobile applications installed on the mobile data processing device to determine a first subset of applications including each of the mobile applications installed on the mobile data processing device that has at least one application keyword tag that matches at least one of the natural language keywords in the set of geolocation keyword tags identifying the first defined geographic area;
    generating at least one front application panel and inserting, by the mobile data processing device, into the generated front application display panel each one of a set of application display icons corresponding to the determined first subset of mobile applications in the set of mobile applications that have matching natural language keywords with the natural language keywords contained in the set of geolocation tags;
    rearranging, by the mobile data processing device, display panels of the mobile data processing device to display the at least one generated front application display panel including each one of the set of application display icons corresponding to the determined first subset of mobile applications having the matching natural language keywords as an uppermost displayed panel, the determined first subset of mobile applications being displayed according to a most recently used order; and responsive to the mobile data processing device determining that the mobile data processing device left the first defined geographic area based on the currently received geographic location data corresponding to the current location of the mobile data processing device and determining that the currently received geographic location data is not within one of the plurality of predefined geographic areas that are predefined and delineated by geographic coordinates stored on the server device:

switching, by the mobile data processing device, to a default mobile application icon display mode, wherein the default mobile application icon display mode displays a default set of display panels including a front default display panel that includes a predetermined default set of application display icons, the predetermined default set of application icons being different than the set of application display icons corresponding to the determined first subset inserted into the generated front application display panel, the front default display panel being displayed as the uppermost displayed panel in the default mobile application icon display mode.

2. The method of claim 1, further comprising:
responsive to the mobile data processing device not exiting the first defined geographic area based on the currently received geographic location data of the mobile data processing device, continuing to display, by the mobile data processing device, the set of application display icons corresponding to the determined first subset of mobile applications having the matching natural language keywords within the generated front application display panel.

3. The method of claim 2, further comprising:
receiving, by the mobile data processing device, from the server device via the network another notification indicating that the mobile data processing device entered a second defined geographic area based on the currently received geographic location data of the mobile data processing device, wherein the second defined geographic area is another one of the plurality of defined geographic areas that are predefined and delineated by geographic coordinates stored on the server device; and responsive to the mobile data processing device receiving the another notification requesting, by the mobile data processing device, from the server device via the network a second set of geolocation keyword tags corresponding to the second defined geographic area.

4. The method of claim 3, further comprising:
responsive to the currently received geographic location data of the mobile data processing device matching the geographic coordinates corresponding to the first defined geographic area, requesting, by the mobile data processing device, the set of geolocation keyword tags corresponding to the first defined geographic area from the server device via the network.

5. The method of claim 1, further comprising:
retrieving, by the mobile data processing device, a user profile that includes display preferences corresponding to the user of the mobile data processing device from the storage device of the mobile data processing device; and rearranging, by the mobile data processing device, the set of application display icons in the display panels based on the display preferences corresponding to the user.

* * * * *